United States Patent [19]

Yonezawa et al.

[11] Patent Number: 4,504,937
[45] Date of Patent: Mar. 12, 1985

[54] OPTICAL INFORMATION TRACKING APPARATUS

[75] Inventors: Seiji Yonezawa, Hachioji; Tatsuo Horikoshi, Toyokawa; Toshiaki Tsuyoshi, Kokubunji, all of Japan

[73] Assignee: Hitachi, Ltd., Tokyo, Japan

[21] Appl. No.: 454,489

[22] Filed: Dec. 29, 1982

[30] Foreign Application Priority Data

Jan. 6, 1982 [JP] Japan ..................................... 57-349

[51] Int. Cl.³ .......................... H04N 5/76; G11B 7/00
[52] U.S. Cl. ......................................... 369/44; 369/46
[58] Field of Search ................... 358/342; 369/43–46, 369/109; 250/201, 202

[56] References Cited

U.S. PATENT DOCUMENTS

| T953,002 | 12/1976 | Firester ............................... 369/46 |
| 4,057,833 | 11/1977 | Braat . |
| 4,065,786 | 11/1977 | Stewart . |
| 4,180,822 | 12/1979 | Hudson et al. . |

FOREIGN PATENT DOCUMENTS

| 35236 | 9/1981 | European Pat. Off. . |
| 50967 | 5/1982 | European Pat. Off. . |
| 53-29701 | 3/1978 | Japan . |

Primary Examiner—Robert L. Richardson
Attorney, Agent, or Firm—Antonelli, Terry & Wands

[57] ABSTRACT

An optical information tracking apparatus for reproducing information by applying light beam onto a track on a rotating record medium, sensing the diffracted light beam thus generated by means of a photodetector and transforming the diffracted light beam into electrical signals, wherein the origin of said photodetector is aligned with the light axis of the optical system, the X axis is placed in parallel with the direction of said track, the Y axis is placed perpendicular to said track. Electrical signals are taken out respectively from photodetector elements which exist respectively in the first, second, third and fourth quadrants. A difference signal representing the difference between a signal which is the sum of the output signal from the first quadrant and that from the third quadrant and a signal which is the sum of the output signal from the second quadrant and that from the fourth quadrant as well as a sum signal representing the sum of output signals from the first to fourth quadrants are calculated. The positive peak value and the negative peak value of said difference signal are held respectively in peak hold circuits, and occurrences of a positive peak and a negative peak of said sum signal fed from the quadrant photodetector are detected to reset said peak hold circuits when a peak of said sum signal having either positive or negative polarity occurs and to effect sample and hold function for a signal which represents the sum of outputs from said peak hold circuits when a peak of said sum signal having the polarity opposite to said polarity occurs so as to obtain the tracking signal.

7 Claims, 13 Drawing Figures

OPTICAL INFORMATION TRACKING APPARATUS

CROSS-REFERENCE TO RELATED APPLICATIONS

The present application relates to subject matter described in U.S. patent application No. 443,871 filed Nov. 23, 1982 (corresponding to Japanese patent application Nos. 187870/81 filed Nov. 25, 1981 and 141121/82 filed Aug. 16, 1982) entitled "INFORMATION RECORDING AND REPRODUCING APPARATUS" by Seiji YONEZAWA, Tatsuo HORIKOSHI, Toshiaki TSUYOSHI and Wasao TAKASUGI, and assigned to the assignee of the present application and to subject matter described in U.S. patent application No. 443,033 filed Nov. 19, 1982 (corresponding to Japanese patent application No. 187871/81 filed Nov. 25, 1981) entitled "DEVICE FOR OPTICALLY TRACKING INFORMATION" by Tatsuo HORIKOSHI, Seiji YONEZAWA, Toshiaki TSUYOSHI, Hiroshi TOOYAMA and Masatoshi OTAKE, and assigned to the assignee of the present application.

The present invention relates to an optical information tracking apparatus and in particular to an information tracking apparatus for tracking the information which has been recorded in optical manner and in the track form on an optical disk.

Hitherto, an example of apparatus for tracking information such as video or audio information which has been recorded in a track form on a rotating optical disk and for thereby reproducing the information in optical manner has been disclosed in the Japanese patent application Laid-Open No. 93222/77. In addition to such known apparatuses, it is possible to conceive an optical system for effecting tracking as illustrated in FIG. 1. For the block construction of a photodetector for obtaining the tracking signal from the optical system as illustrated in FIG. 1 and a signal processing circuit for processing the signal therefrom, that disclosed in the above described Japanese patent application Laid-Open No. 93222/77 can be applied, which is shown in FIG. 2.

In FIG. 1, the light emitted from a laser beam source 1 forms a light spot 7 on a train of pits, i.e., a track 9 on a disk 8 via a coupling lens 2, a beam splitter (a polarizing prism) 3, a galvanomirror 4, a quarter wavelength plate 5 and an object lens 6. The reflected light beam diffracted by the track 9 returns to the above described optical system again. It is reflected by the beam splitter 3 due to the polarization effect of the quarter wavelength plate 5 and is received by a photodetector 10. In FIG. 1, numeral 11 denotes a motor for rotating the disk 8 and numeral 11 denotes a spindle.

In FIG. 2, the origin of the photodetector is aligned with the light axis of the optical system (FIG. 1), the X axis is placed in parallel with the track direction, and the Y axis is placed perpendicular to the track. Output signals $I_{11}$, $I_{13}$, $I_{12}$ and $I_{14}$ are taken out respectively from photodetectors 11, 13, 12 and 14 which exist respectively in the first, second, third and fourth quadrants. A signal DF represented as $$DF = (I_{11} + I_{12}) - (I_{13} + I_{14})$$

is produced by adder circuits 15 and 16 as well as a subtractor circuit 17. A signal RF represented as $$RF = (I_{11} + I_{12}) + (I_{13} + I_{14})$$

is produced by adder circuits 15, 16 and 18. And the phase of the RF signal is shifted by 90° in a phase shifter 19. The output of the phase shifter 19 and the DF signal are applied to a multiplier 20. The resultant product is applied to a low-pass filter 21 to yield a tracking signal 22.

In such a conventional apparatus, the tracking signal is calculated in a synchronous rectifier circuit composed of a combination of the multiplier 20 and the low-pass filter 21. Accordingly, the tracking detection sensitivity is low. That is to say, the error signal produced when the light spot 7 gets out of the center of the information track 9, i.e., the so-called tracking signal has a low output level. This results in a problem that the S/N ratio of the tracking signal is low.

An object of the present invention is to provide a tracking apparatus wherein all of the above described problems in calculating the tracking signal from the sum signal (RF signal) and the difference signal (DF signal) of the quadrant photodetectors illustrated in FIG. 2 are resolved, the detection sensitivity of the tracking signal is raised to increase the S/N ratio, and therefore stable tracking can be realized.

To achieve the object, in accordance with the present invention, two peak hold circuits respectively for detecting the positive and negative peak values of the DF signal are provided and the time point when the positive peak value of the RF signal occurs as well as the time point when the negative peak value of that signal occurs are detected, the above described peak hold circuits being reset by one of just described two time points and the sum signal derived from the above described peak hold circuits is sampled and held at the other of just described two time points. According to the present invention, only the maximum signal output of the DF signal can be sampled and held. That is to say, synchronous detection can be effected at a pit end. Accordingly, the detection sensitivity of the tracking signal can be maximized, resulting in stable tracking.

The present invention will now be explained in conjunction with the accompanying drawings, in which.

Figure 3:
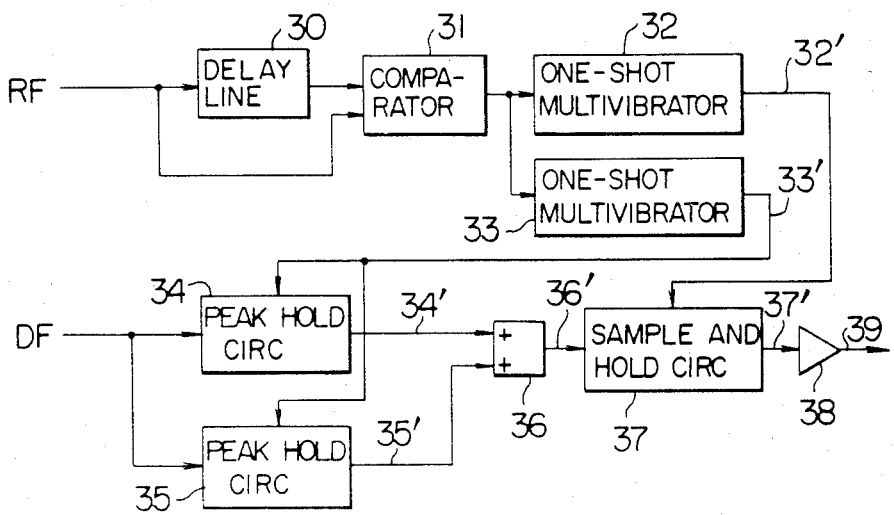
Figure 4:
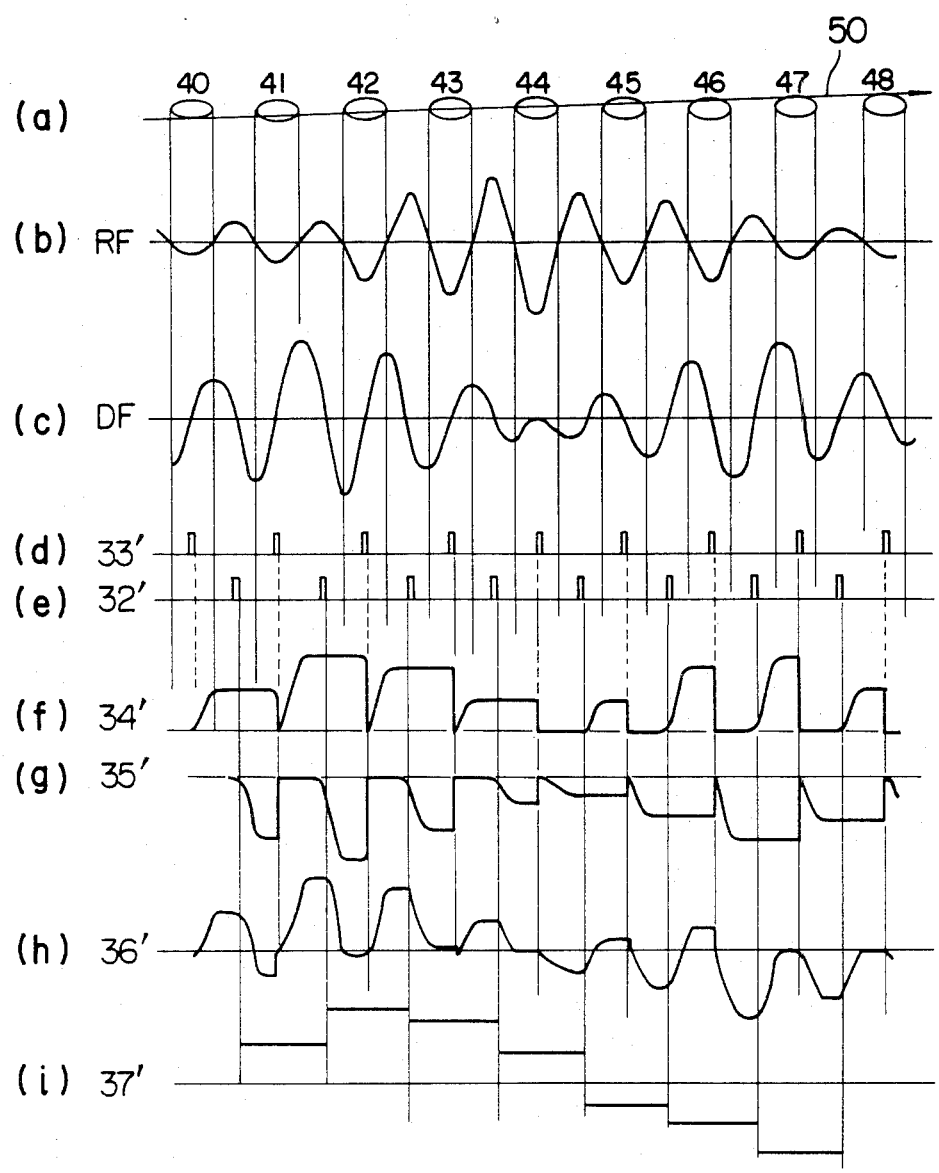
Figure 5:
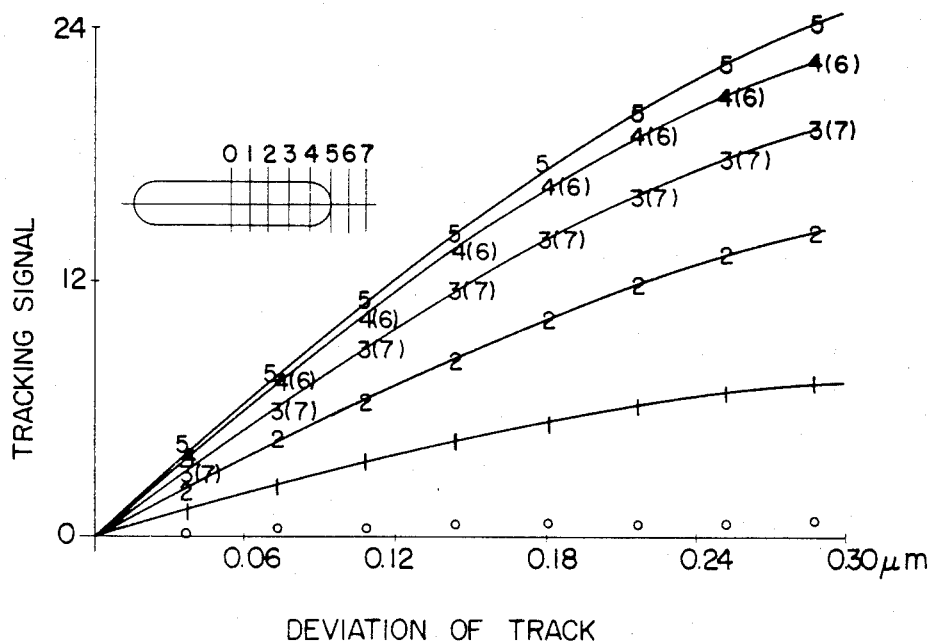

FIG. 3 and FIG. 4 consisting of (a)–(i), are drawings for illustrating an embodiment of the present invention wherein a tracking signal is obtained from information pits; and FIG. 5 shows the relationship between the tracking signal and the track deviation.

The principle of the present invention will be explained at first.

Figure 1:
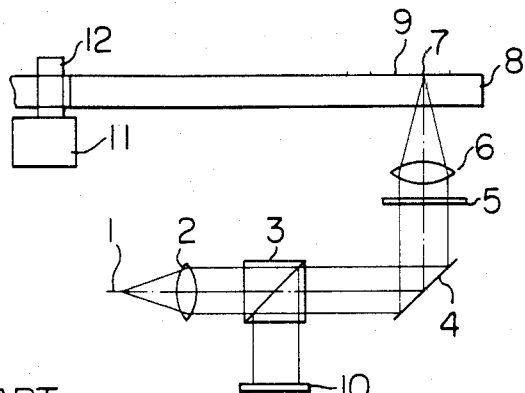
FIG. 1 shows the schematic construction of an optical system for tracking and reproducing information which has been recorded on an optical disk.
Figure 2:
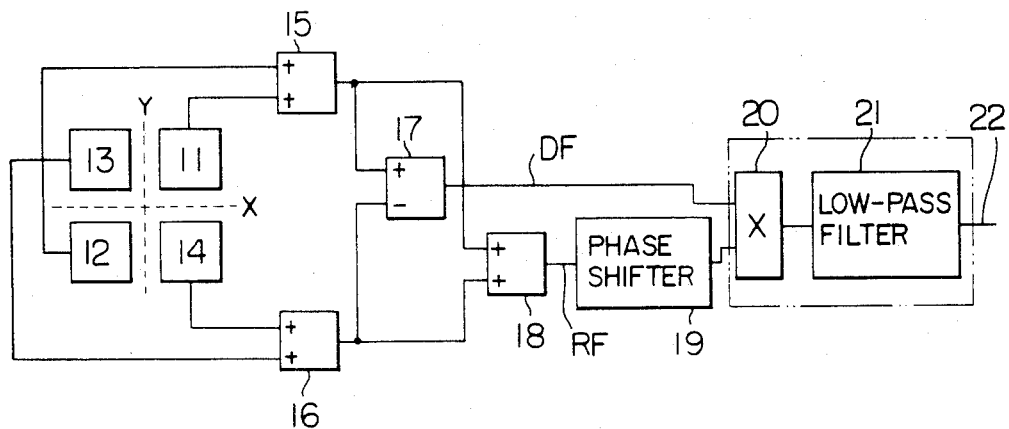
FIG. 2 is a block diagram for illustrating a photodetector and a signal processing circuit for obtaining the tracking signal according to the prior art.

The sum signal of the electrical signals produced from photodetectors 11, 12, 13 and 14 illustrated in FIG. 2 expressed as $$RF = (I_{11} + I_{12}) + (I_{13} + I_{14})$$

and the difference signal expressed as $$DF = (I_{11} + I_{12}) - (I_{13} + I_{14})$$

are represented as a function of construction of the track 9 on the disk 8, i.e., a function of the width, length and depth of a pit, the wavelength of the applied light and the numerical aperture of the lens 6.

FIG. 5 shows the numerically calculated output signal produced from the DF signal when the light spot is deviated from the center of the track in the direction perpendicular to the track. As for the parameters of the optical disk in FIG. 5, the wavelength is 0.81 μm, the pit depth is λ/5, the pit width is 0.58 μm, the pit length is 0.87 μm, the pit pitch is 1.74 μm, the track pitch is 1.6 μm and the numerical aperture of the lens is 0.5. In FIG. 5, the abscissa represents the deviation amount of the light spot from the center of the track in the direction perpendicular to the track, i.e., the tracking error and the ordinate represents the tracking error signal produced from the DF signal. Also in FIG. 5, numerals 0 to 7 indicated on curves represent positions on the pit where synchronous detection is effected for the DF signal. The positions are illustrated to the left hand of the curves. For example, the curve designated as 0 shows the calculated result in the case where synchronous detection is effected at the center of the pit and curve designated as 5 shows that in the case where synchronous detection is effected at the end of the pit. As evident from FIG. 5, the tracking sensitivity is almost zero when the light spot exists at the center of the pit (the position designated as 0) where the RF signal presents its peak. As the light spot approaches the end of the pit, the sensitivity is increased and when synchronization detection is effected at the end of the pit (the position designated as 5) where the RF signal assumes the zero value, the tracking sensitivity is maximized. Even if synchronization detection is effected at a point beyond the position designated as 5, the tracking sensitivity is decreased. In this way, the output level of the tracking signal is maximized near the pit end. In other words, the maximum output level is obtained in an area between the center of a pit and an intermediate point between the pit and an adjacent pit, i.e., a section between a point where the RF signal assumes its negative peak value and a point where the RF signal assumes its positive peak value.

In view of the above described point, according to the present invention, the DF signal is applied to the peak hold circuit when the RF signal exists in a section transferring from one peak to the next peak so that the tracking signal may be detected at its largest output level to realize more stable tracking control.

An embodiment of the present invention will be described referring to FIG. 3 and FIG. 4. FIG. 3 is a block diagram of a circuit for producing the tracking signal. FIG. 4 is a drawing for illustrating the operation in the circuit shown in FIG. 3 and shows signal waveforms at various blocks in FIG. 3. As shown in FIG. 4(a), a train of pits 40 to 48 have been recorded on the disk 8, forming a track in the rotation direction of the disk. The light spot 7 is applied along a locus 50 slightly crossing the train of pits in the track form obliquely. The sum signal (RF signal) and the difference signal (DF signal) produced then from the outputs of the quadrant photodetectors 11 to 14 are shown in FIGS. 4(b) and (c) respectively.

The RF signal assumes its minimum level at the center of each pit and the DF signal assumes its positive peak level or negative peak level at the end of each pit. Viewing from the time sequence, the DF signal lags behind the RF signal in phase by 90° on the one side of the track. And the DF signal is in advance of the RF signal in phase by 90° on the other side of the track. The method for obtaining the tracking signal from the RF signal and the DF signal will be described hereafter.

The RF signal is fed to a delay line 30. The output of the delay line 30 and the RF signal are fed to a comparator 31, the output of which is fed to one-shot multivibrators 32 and 33. The one-shot multivibrators 32 and 33 produce pulses respectively at the positive peak and negative peak of the RF signal. The outputs 32' and 33' of the one-shot multivibrators are respectively shown in FIG. 4(e) and FIG. 4(d). The pulse 32' is used as the control pulse for a sample and hold circuit 37 and the pulse 33' is used as the reset pulse for peak hold circuits 34 and 35 to which the DF signal is applied. After the reset pulse 33' is applied, the output 34' of the positive peak hold circuit 34 and the output 35' of the negative peak hold ciruit 35 change as illustrated respectively in FIG. 4(f) and FIG. 4(g). The outputs 34' and 35' of the peak hold circuits 34 and 35 are added up in a adder 36 to yield the output 36' as illustrated in FIG. 4(h). The adder output 36' is held in the sample and hold circuit 37 by the sample and hold control pulse 32'. The resultant output 37' as illustrated in FIG. 4(i) is amplified by an amplifier 38. The output 39 of the amplifier 38 can be used as the tracking signal. Owing to the above described circuits, it becomes possible to sample and hold only the largest output level of the DF signal and to derive the tracking signal at the latter end of the pit.

As heretofore described, the aforementioned object can be accomplished by effecting synchronous detection at the latter end of the pit as illustrated in FIG. 5 according to the present invention. That is to say, stable tracking can be realized. As a result, stable information readout from an audio disk or a video disk is brought about.

We claim:
1. In an information reproducing apparatus including a laser beam source, a rotating record medium provided with an information track in the form of a succession of alternating depressed areas and non-depressed areas along the length of said track, an optical system provided between said laser beam source and said record medium for applying a light beam of said laser beam source onto said track, and a photodetector for sensing the light beam diffracted by said track, said photodetector including four photodetector elements disposed respectively in first to fourth quadrants of a plane defined by an origin aligned with the light axis of said optical system, an axis in parallel with the direction of said track and an axis perpendicular to said track, information being reproduced from output signals of said four photodetector elements, an optical information tracking apparatus comprising:
first means for producing a sum signal representing the sum of said output signals of said four photodetector elements;
second means for producing a difference signal representing the difference between a signal which is the sum of the output signal of the photodetector element in said first quadrant and the output signal of the photodetector element in said third quadrant and a signal which is the sum of the output signal of the photodetector element in said second quadrant and the output signal of the photodetector element in said fourth quadrant;

third means for producing two pulse signal respectively indicating a positive peak point and a negative peak point of said sum signal;

first peak hold means and second peak hold means respectively for holding a positive peak value and a negative peak value of said difference signal, one of said two pulse signals of said third means effecting control over the hold function in said first peak hold means and said second peak hold means; and fourth means for synchronously detecting the output signal of said first peak hold means and the output signal of said second peak hold means with the other of said two pulse signals of said third means, the output signal of said fourth means being used as the signal for tracking said information.

2. An optical information tracking apparatus according to claim 1, wherein said fourth means includes means for holding a signal which is the sum of an output signal from said first peak hold means and an output signal from said second peak hold means, the other of said two pulse signals of said third means effecting control over the hold function therein.

3. An optical information tracking apparatus according to claim 1, wherein said third means includes delay means for delaying said sum signal, comparator means having one input coupled to the output of said delay means and the other input coupled to receive said sum signal, and first pulse signal generator means and second pulse signal generator means for producing said two pulse signals respectively when the output of said comparator means falls and rises.

4. An optical information tracking apparatus according to claim 1, wherein said fourth means includes adder means for producing a sum signal which represents the sum of said output signal of said first peak hold means and said output signal of said second peak hold means, and sample and hold means for sampling the output signal of said addier means and holding the sampled output signal, the other of said two pulse signals of said third means effecting control over the sample and hold function in said sample and hold means.

5. In an information reproducing apparatus including a laser beam source, a rotating record medium provided with an information track in the form of a succession of alternating depressed areas and non-depressed areas along the length of said track, an optical system provided between said laser beam source and said record medium for applying a light beam of said laser beam source onto said track, and a photodetector for sensing the light beam diffracted by said track, said photodetector including four photodetector elements disposed respectively in first to fourth quadrants of a plane defined by an origin aligned with the light axis of said optical system, an axis in parallel with the direction of said track and an axis perpendicular to said track, information being reproduced from output signals of said four photodetector elements, an optical information tracking appartus comprising:

first means for producing a sum signal representing the sum of said output signals of said photodetector elements;

second means for producing a difference signal representing the difference between a signal which is the sum of the output signal of the photodetector element in said first quadrant and the output signal of the photodetector element in said third quadrant and a signal which is the sum of the output signal of the photodetector element in said second quadrant and the output signal of the photodetector element in said fourth quadrant;

third means for producing two pulse signals respectively indicating the positive peak point and the negative peak point of said sum signal;

fourth means for holding a positive peak level and a negative peak level of said difference signal; and fifth means for holding the sum of said positive peak level and said negative peak level of said difference signal, one of said two pulse signals effecting control over the hold function in said fourth means, and the other of said two pulse signals effecting control over the hold function in said fifth means, the output signal of said fifth means serving as a tracking signal for said information.

6. An optical information tracking apparatus according to claim 5, wherein said third means includes delay means for delaying said sum signal, comparator means having one input coupled to the output of said delay means and the other input coupled to receive said sum signal, and first pulse signal generator means and second pulse signal generator means for producing said two pulse signals respectively when the output of said comparator means falls and rises.

7. An optical information tracking apparatus according to claim 5, wherein said fourth means includes first peak hold means and second peak hold means respectively for holding a positive peak level and a negative peak level of said difference signal, and said fifth means includes adder means for producing a sum signal which represents the sum of said output signal of said first peak hold means and said output signal of said second peak hold means and sample and hold means for sampling the output signal of said adder means, and holding the sampled output signal, said one of said two pulse signals of said third means effecting control over the hold function in said first peak hold means and said second peak hold means while said other of said two pulse signals of said third means effecting control over the sample and hold functions in said sample and hold means.

* * * * *